3,848,039
METHOD OF MAKING PATTERNED LAYERS
Ernst Schneppenhorst, Krefeld, and Ferdinand Leifeld, Hasenheide, West Germany, assignors to Textilausrustungs-Gesellschaft Schroers & Co., and Eduard Kusters Machinenfabrik, both of Krefeld, Germany
No Drawing. Filed Dec. 3, 1971, Ser. No. 204,622
Claims priority, application Germany, Dec. 5, 1970,
P 20 59 936.4
Int. Cl. B29c 21/00
U.S. Cl. 264—73          9 Claims

ABSTRACT OF THE DISCLOSURE

This disclosure is directed to a method of forming patterned synthetic layers, particularly on textile webs. A first portion of synthetic material is applied as a continuous layer or film and a second portion is applied onto the web as a discontinuous layer, i.e., as drops, and allowed to flow freely to form the pattern. The product is then hardened.

Alternatively a first discontinuous layer of synthetic material is applied to an inert assistant carrier and hardened thereon, then a second continuous layer of synthetic material is spread onto the hardened layer, and a textile web is laminarly impressed upon the fluid second layer. The second layer is then hardened and the assistant carrier is removed.

BACKGROUND

Textile patterns are conventionally applied by a printing process which imparts a regular pattern to the textile. Recent improvements in this art have led to the development of processes and devices for applying random patterns to textiles, for example, as disclosed in copending application Ser. No. 119,540, filed Mar. 1, 1971, by Appenzeller, Valentin and Leifeld, Ferdinand, now U.S. Pat. 3,731,503. Another type of process is to use one or more layers of synthetic material to form a pattern; however, this technique is directed primarily to laminates of nonflexible materials made from curing friable layers, such as disclosed in U.S. Pat. 3,219,735.

It is an object of the present invention to provide an improved process for applying synthetic materials onto a carrier to form a random pattern. This and other objects are set forth in greater detail in the accompanying specification and drawings.

THE INVENTION

This invention relates to a process for the manufacture of patterned synthetic layers in which a synthetic material is applied to a carrier in liquid form and is hardened thereon.

The invention is directed to a new process in which, in contrast to printing, the pattern components are not applied to the carrier by mechanical means in a predetermined arrangement and with a predetermined pattern but rather are brought together in a free-moving distribution in order to create random patterns whereby the pattern-forming components themselves form the layer.

In an embodiment of the invention, a liquid film is applied to a carrier. Thereafter, the various pattern-creating surface synthetic materials are applied in flowable form onto the liquid film whereby the flowing surface portions abut one another in accordance with their physical properties or the physical properties of the film and carrier, and reach a patterned distribution. The surface and film synthetic materials are then fixed or heat-set in position. The various synthetic materials of the surface and film have a wide range of physical properties or properties of a physical-chemical nature. For example, the solubility surface tension, and adhesive strength with respect to the carrier and with respect to each other, may vary as they are brought in contact with each other and the carrier in a liquid form.

Several physical and chemical reactions occur at the boundaries of the surface materials. The synthetic components are soluble with each other in varying degrees. The synthetic components displace one another at points, partly glide over one another, etc. All of these phenomena lead to the formation of the pattern. The uniqueness of the pattern produced arises from the fact that synthetic materials are not externally acted upon after their application to the carrier. The synthetic materials produce the pattern by their own interreaction as they react to their relative physical-chemical forces due to their freedom of motion vis a vis one another by virtue of their free-flowing character. Preferably the synthetic materials are various-colored batches which together form a colored patterned layer. The invention also includes use of synthetic components which have various surfaced structures, for example, dull or glossy or pitted or similar surfaces, and thus are not necessarily of different colors.

Preferably the application of at least one of the synthetic components should be carried out in such a way that the portion, to be applied reaches the carrier in free motion, for example, as flowing drops. The individual synthetic batches should thus not be applied to the carrier by mechanical means such as pressure rolls which have direct contact with the carrier and thus distribute and spread by external pressure. The flowable synthetic components should reach the carrier in free form and only under the influence of gravity or the inertia of their own motion and they should seek their own distribution on the carrier uninfluenced by mechanical means. Such an application, for example, can be obtained when individual drops are caused to fall onto the web or carrier under the influence of gravity alone, or when the drops are spray-applied under pressure. Alternatively, the application can be carried out in the form of a fluid film extending transversely across the carrier.

One of the techniques which is conveniently used to insure a continuous process is an application device with a roll across the horizontal or mainly horizontal track of the textile web or carrier. The lower part of the roll is in the fluid of a container and takes up fluid from it. A doctor blade which leans toward the falling side of the circulating roll takes the fluid from the roll. The fluid then goes over the doctor blade and falls from its lower edge onto the web or carrier which passes by beneath. On the doctor blade there are fluid channels so that the fluid arrives on the web or carrier in jets or a series of drops. Beneath the doctor blade a movable sifter or divider mechanism (i.e., a screen or comb) can be placed for the distribution of the fluid. The doctor blade can be moved relative to the web or carrier and can make movements back and forth with a certain frequency which leads to a corresponding distribution of the fluid. With such an installation it is possible to apply fluids in many modified arrangements as in the form of dots, stripes or waves. A suitable mechanism is disclosed in copending application Ser. No. 119,540.

In one embodiment of the process the first applied film is a film of a solvent or thinning material for the synthetic component to enhance its flowability. The solvent or dilutant results on the one hand in a known mixing effect which occurs in wet on wet work resulting in a partial dissolving of the liquid portions and a simplified gliding of the same on the layer of solvent. On the other hand, due to the changed adhesion, the liquid synthetic components can spread out more readily than on a dry carrier. In another embodiment of the process the process the first-applied film comprises a flowable synthetic component so that the further synthetic components added are applied onto a liquid synthetic layer.

The film can be applied in a uniform layer and the uniformity of the layer can be improved by rubbing. It is, however, also possible to apply the film in a specific patterning whereby then the synthetic components penetrate and spread out in accordance with patterns formed by the solvent. Prior to the application of the synthetic components additional techniques can be used to mechanically change the surface of the carrier. Such techniques which, for example, can cause a wrinkling or a pitting of the carrier surface, create depressions or channels for the subsequent application of the synthetic components in which these liquid components tend to flow and in which they form the corresponding patterns.

A further substantial embodiment of the process comprises influencing the synthetic components in their viscosity and their physical reaction with the carrier and with the other synthetic components by the addition of solvents or dilutants. Through the selection of the solvents a significant change in the pattern can be achieved, and increased addition of solvents results in a lower viscosity and thereby in a greater mobility of the fluid portions such as the drops added to the carrier. Depending upon the relative solubility of the materials in adjacent drops or flowable portions, particularly of the dyeing materials, there will occur in the pheripheral layers a reduction in the dissolved materials of the drops or of the flowable portions. For example, if the dissolved or dispersed material is more soluble in the solvent of a neighboring drop or flowable component it can migrate thereto. The surface tension and the adhesion with respect to the carrier and to neighboring flowable portions also strongly affect the pattern and by changing these, significant changes in the pattern can be effected. So, for example, a new drop may completely displace the liquid layer upon which it falls if the former has a stronger adhesion to the carrier. The entire original layer will then be pushed together into a narrow branched-out boundary line.

To regulate the flow of the various synthetic components it is advantageous to add a boundary-influencing substance to the synthetic components. To avoid the possible formation of a lenticular relief which could be formed by various liquid components of the layer, particularly if these have a higher viscosity and a more paste-like consistency, it has proven to be of value to add a boundary surface active substance, i.e., a form-preventing material such as silicone defoamer to the synthetic components. With these additions an entirely smooth surface is obtained, even in the transition areas between the individual fluid components. A further technique of influencing the synthetic components and thus the formation of the pattern lies in applying the various synthetic components at different temperatures.

In one preferred embodiment of the invention the synthetic materials are heat-setting and the carrier is placed in an oven after application of the synthetic components. Examples of such synthetics are polyvinylchloride and polyurethane.

The application of heat-setting synthetics at various temperatures means that the setting in the moment of application at approximately equal viscosities varies in speed and that the setting of the various components of the pattern varies in speed. While some are still in motion, others are already hardened to a state of immobility.

It can also be recommended to apply the synthetic components in various states of presetting. In this manner liquid components of different viscosities are brought together from the start.

The carrier can be an auxiliary carrier from which the synthetic layer is to be separated after setting, or the carrier can be a component of the final material to be produced.

For the former case silicone paper has proven to be an appropriate auxiliary carrier, that is paper that has a silicone layer or that has been impregnated with silicone. Such an auxiliary carrier permits an easy separation of the synthetic layer which has been produced and can be reused in the same way repeatedly to reduce expenses. Alternatively, other conventional inert or strippable carriers can be used.

For the latter case in which the carrier is part of the material to be produced, a fibrous surface, particularly a textile material is preferable. Such materials can be woven materials of all kinds as well as nonwoven felt and the like. It is also possible to use as a carrier a preformed synthetic layer.

Even though the synthetic components to be applied to the carrier are intended to form their individual patterns by virtue of their own properties and without direct influence on the fluid from the outside, it is nevertheless possible to influence the layer on the carrier by guiding the carrier. While normally the flowable synthetic components are applied to the horizontal surface, that is a horizontally moving carrier, it is also possible to form a structure for the pattern by guiding the carrier over an inclined plane before setting of the synthetic components. The provision of a hanging position for the carrier or the guidance of the carrier with its back over a roll or a rod from which it hangs from both sides influences the pattern in unique ways. The period of time between the application of the synthetic material and the setting thereof also affects the pattern formed. The processes which form the pattern take place by virtue of the occurrance of diffusion. The corresponding liquid motion comprises a flowing of viscous liquid. Both are a function of time so that through the appropriate choice of a period of time prior to initiating setting, a differing flowing of the pattern components can take place.

When the object is to produce artificial leatherlike webs for clothing, for furniture covering or the like, in which a relatively thin synthetic layer is attached to the surface of a carrier material that should not soak thereinto, the following embodiment of the invention is used. One or more synthetic components are applied to a synthetic repellent auxiliary carrier, and the components are set. A further synthetic layer is applied onto the set layer and a carrier material is impressed into the still liquid-phased layer of the second synthetic components. Thereafter this second synthetic layer is set and the original auxiliary carrier is removed. After the carrier material is pressed onto the second synthetic layer, the latter is between the auxiliary carrier and the carrier and is set in this condition. In the case of the heat-setting synthetic, the material is placed into an oven. After termination of the fixation the carrier will have become attached to the synthetic layers while the auxiliary carrier which is synthetic-repellent can be removed without difficulty. For this embodiment of the process polyurethane is particularly adaptable.

To heighten the resistance capability and glossiness and the smoothness it is possible to apply a further clear layer upon the synthetic layer, that is a layer of a translucent or transparent synthetic.

As a first example the manufacture of a polyvinylchloride layer on a web will be described. The operation occurs at room temperature. First a synthetic material of following components is applied to the woven web.

Parts

Hostalit PVP 3475 (polyvinylchloride - emulsion; "Hostalit" being a registered trademark of Farbwerke Hoechst AG) _____ 45

Witamol IW 110 (plasticizer; "Witamol" being a registered trademark of Chemische Werke Witten GmbH) _____ 55

Microjurawhite (pigment) _____ 10

A dye is added to the above mixture in an amount sufficient to achieve the desired visual effects. The charge is used in ungelled form. The viscosity measurement in a DIN beaker with a number 6 jet is a flowing time of approximately 50 seconds, and varies with the amount of dye added. Into this base layer which comprises a flowable film the following mixture is applied in a manner described previously with a roll and doctor blade arrangement.

| | Parts |
|---|---|
| Hostalite PVP 3475 | 50 |
| Witamol IW 110 | 50 |

This second charge also contains a dye in an amount sufficient to achieve the desired visual effects. This mixture is diluted with approximately 10% test benzine and one gram per kg. silicone defoamer SH is added. The viscosity measurement in a DIN beaker with a size 4 jet is between 30–40 seconds and varies with the amount of dye used. The rate of movement of the web is aproximately 10 m. per minute, the circumferential speed of the dye applying roll is approximately 1.9 m. per minute, and the frequency of the oscillatory motion of the doctor blade transversely to the web is 2.7 Hz. The product is hardened at 200° C.

If the original layer is dark and the subsequently applied synthetic component is dyed light, they will result in a short time after application of the synthetic component in a pattern. The light areas are drops of the second synthetic component whereas the dark areas correspond to the first applied base layer. The lighter drops spread out substantially and force themselves over the base film or displace the base film until only a weak boundary area of the base film is visible. On the other hand, the base film also dissolves somewhat in the second synthetic components so that in the periphery areas a mixture appears.

After a standing time in an unpolymerized state of approximately 20 minutes, the second synthetic component has spread out almost over the entire surface and only thin lines of the base film are visible. The setting time is dependent upon the desired pattern. As soon as this is achieved the material is heated so that the fixing begins and further changes cannot take place.

In one working example in which the synthetic material used was polyurethane, methylglycol acetate was splashed onto an auxiliary carrier of silicone paper and was spread to an even distribution by a rubbing roll. The rubbing roll used was a polished steel roll rotating contrary to the direction of the web.

A mixture of methylglycol acetate and colored polyurethane in a proportion of 1 to 2 was applied in drops into the methylglycol acetate layer forming the flowable film. In the heating which followed after a certain time the solvent evaporated and a polymerization and setting took place.

On the set layer there was applied a further layer of polyurethane and upon that a textile carrier material was pressed on by rolling. Then the setting of the second layer of polyurethane and its linking to the textile carrier was achieved, thereafter the paper serving as auxiliary carrier was removed.

As the time interval, between application of the synthetic components in drops and the heating step, increases the size of the patterns increase. With polyurethane, good results were also obtained when test benzine was used instead of methylglycol acetate. Also mixtures of methylglycol acetate and test benzine were tried. It is also possible to use other solvents, such as dimethylformamide. Thus it is possible to change the properties of the patterns as desired.

This example further illustrates a method of applying polyurethane to a textile web. The following basic formulation was made for use as the continuous layer (all parts are by weight):

| | |
|---|---|
| Polyurethane | 30 |
| Ethyl acetate | 70 |
| Cross-linking agent | 5 |
| Accelerator | 5 |
| Pigment | 8 |

A second batch of the above formulation, for use as the discontinuous layer, was thinned with methylglycol acetate to provide a viscosity of 60 seconds, as measured in a DIN beaker having a size 3 jet.

The process was carried out as follows. A solvent layer of methyl glycolacetate was applied to a strip of silicone paper. The silicone paper was then moved at a rate of 8 m./min. below a device which added drops of polyurethane (above formulation) as a discontinuous film upon the paper. The application roller rotated at 2 m./min., and the adjacent blade had a frequency of 2.7 Hz.; a band device operating at 0.5 m./min. interrupted the stream from the doctor to provide droplets of polymer which fell upon the silicone paper. The silicone paper was then passed through an oven to harden the polyurethane. A continuous layer of polyurethane (basic formulation above) was then applied over the hardened polyurethane droplet layer and a textile web was then impressed upon the fluid continuous layer. The product was passed through an oven and hardened at a temperature up to 155° C. The final product contained a total weight of 120 g./m.$^2$ of polyurethane of which 20 g./m.$^2$ was from the initial application of polyurethane droplets.

The selection of the synthetic materials useful in this invention can be made from a wide variety of polymeric materials well-known to those skilled in the art. Further technical details on the preferred polyurethanes and polyvinylchloride are found in many standard reference works. Note, for example, the Encyclopedia of Chemical Technology, Kirk-Othmer, 2d. ed., vol. 21 and the references cited therein.

A characteristic of the present invention is that the discontinuous layer has a low viscosity which enables the polymer to freely flow on a horizontal surface. The movement of the textile web upon which the polymer is placed is sufficiently slow as to have no substantial effect upon the flow of the polymer; the movement of the web however enables the process to be carried out continuously. The low viscosity of the discontinuous layer is distinguishable from the prior art paste-like polymers which are applied by conventional coating techniques. The viscosity of the polymers applied as a discontinuous layer are preferably within the range of 20–70 seconds as measured in a DIN beaker with a size 4 or 3 jet. This low viscosity is achieved by using a solution, dispersion, or emulsion of the polymer in which the solvent or dispersing agent comprises at least 10% and up to about 90% of the total polymer composition which is applied as the discontinuous layer. A preferable range is from about 1 to 2 parts of solvent or dispersing agent for each part of polymer. The solvent or dispersing agent used can be selected from those well-known in the art for the polymer which is to be applied. For example, for the polyurethane substances, commercial solvents such as test benzine and methylglycol acetate (methyl Cellosolve acetate) are useful.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed is:

1. A process for coating a textile web with a curable polymeric material in a random color pattern, comprising: applying a liquid film to a moving, inert carrier web, said liquid film consisting of a solvent for said polymeric material; applying to said liquid film a low-viscosity colored mixture of said polymeric material in a solvent therefor to form a discontinuous, random pattern of said colored mixture; curing said polymeric material, while keeping a random pattern; forming over said random pattern a continuous layer of a polymeric material and applying a textile web to said continuous layer; curing said continuous layer in contact with said textile web to form a coated textile product and removing the inert carrier from said coated textile product.

2. The process of claim 1 wherein said inert carrier comprises a silicone-coated carrier.

3. The process of claim 1 wherein said polymeric materials comprise at least one polyurethane.

4. The process of claim 1 comprising applying a polyurethane solvent to the inert carrier prior to applying said discontinuous layer.

5. The process of claim 1, wherein the manner of applying said low viscosity colored mixture is adapted to provide said polymeric material on said carrier whereby said polymeric material freely flows over the surface of said carrier material to produce a random pattern of a discontinuous nature.

6. The process of claim 1 wherein the polymeric material is adapted to produce a patterned synthetic layer having a smooth surface.

7. The process of claim 1 wherein the carrier has a horizontal surface upon which the polymeric material freely flows.

8. The process of claim 1 wherein said low viscosity colored mixture is applied in the form of drops to said inert carrier.

9. The process of claim 8 wherein said drops comprise polyurethane in a solvent.

References Cited
UNITED STATES PATENTS

| | | | |
|---|---|---|---|
| 2,739,919 | 3/1956 | Artzt | 156—239 X |
| 3,650,880 | 3/1972 | Tieniber | 156—246 X |
| 3,393,106 | 7/1968 | Marrinan et al. | 156—247 X |
| 3,619,257 | 11/1971 | Fukada | 117—63 X |
| 3,434,861 | 3/1969 | Luc | 156—247 X |
| 3,678,011 | 7/1972 | Hino et al. | 156—246 X |
| 3,330,713 | 7/1967 | Watson et al. | 156—247 X |
| 2,631,958 | 3/1953 | Francis | 156—239 X |
| 2,587,594 | 3/1952 | Chavannes et al. | 264—245 |
| 3,312,761 | 4/1967 | Vida | 264—73 |
| 3,325,322 | 6/1967 | Satas | 264—121 |

OTHER REFERENCES

Arkhangelskii et al.: Fiberglass Boat Building, U.S. Dept. of Commerce, Washington, D.C. (1964), p. 82 relied on.

ROBERT F. WHITE, Primary Examiner

W. E. HOAG, Assistant Examiner

U.S. Cl. X.R.

264—245, 255, 257

UNITED STATES PATENT OFFICE
CERTIFICATE OF CORRECTION

PATENT NO. : 3,848,039
DATED : November 12, 1974
INVENTOR(S) : Ernst Schneppenhorst et al It is certified that error appears in the above-identified patent and that said Letters Patent are hereby corrected as shown below:

in column 6, line 14, change "adjacent blade" to read --adjacent doctor blade-- in column 7, line 12 (claim 4) after "said" delete "discontinuous layer" and substitute --low viscosity colored mixture-- in column 7, line 18 (claim 5), change "of a discontinuous nature" to read --of a low viscosity colored mixture--

Signed and Sealed this nineteenth Day of August 1975

[SEAL]

Attest:

RUTH C. MASON
Attesting Officer

C. MARSHALL DANN
Commissioner of Patents and Trademarks